United States Patent
King et al.

(10) Patent No.: US 8,464,743 B2
(45) Date of Patent: Jun. 18, 2013

(54) INLINE DISPERSAL VALVES

(75) Inventors: Joseph A. King, Wayzata, MN (US);
Randy Williams, Minneapolis, MN (US); Kenneth V. Schomburg, Wayzata, MN (US); Jeffrey Johnson, Minneapolis, MN (US); Mark Snetting, Eden Prairie, MN (US)

(73) Assignee: King Technology, Inc., Hopkins, MN (US)

( * ) Notice: Subject to any disclaimer, the term of this patent is extended or adjusted under 35 U.S.C. 154(b) by 322 days.

(21) Appl. No.: 12/584,554

(22) Filed: Sep. 8, 2009

(65) Prior Publication Data

US 2010/0000610 A1     Jan. 7, 2010

Related U.S. Application Data

(62) Division of application No. 11/128,124, filed on May 12, 2005, now Pat. No. 7,604,018.

(51) Int. Cl.
*F16L 55/00* (2006.01)
*F16K 51/00* (2006.01)

(52) U.S. Cl.
USPC .............. 137/15.08; 137/15.18; 137/800; 222/551; 222/562

(58) Field of Classification Search
USPC . 137/15.08, 15.18, 15.01, 268, 800; 422/264, 422/266; 239/310; 222/551, 562
See application file for complete search history.

(56) References Cited

U.S. PATENT DOCUMENTS

| | | | | |
|---|---|---|---|---|
| 2,521,802 A * | 9/1950 | Otto | ............... | 422/264 |
| 2,536,361 A | 1/1951 | Flanders | | |
| 2,604,446 A | 7/1952 | Palmer | | |
| 3,899,425 A * | 8/1975 | Lewis | ............ | 422/264 |
| 4,662,387 A * | 5/1987 | King, Sr. | ......... | 137/268 |
| 5,620,671 A * | 4/1997 | Shoemaker | .......... | 422/266 |
| 5,624,559 A * | 4/1997 | Levin et al. | ............ | 210/447 |
| 6,803,237 B2 * | 10/2004 | Manganini et al. | ........... | 436/175 |
| 2003/0005966 A1 | 1/2003 | Johann | | |

* cited by examiner

*Primary Examiner* — Kevin Lee
(74) *Attorney, Agent, or Firm* — Jacobson & Johnson LLC

(57) ABSTRACT

An inline dispersal valve that can be used with or without a base. One embodiment includes a rotatable member that is rotatable from a fluid stream obstructing condition to an out-of-the-way condition to prevent fluid diversion into the dispersal valve. Another embodiment includes a lever handle for quickly setting the amount of fluid being diverted into the inline dispersal valve. Another embodiment includes an indicator that can be viewed from a position above the inline dispersal valve. Another embodiment includes a cap that can be secured or removed without the aid of tools. Another embodiment includes a clip that allows one to disassemble the inline dispersal valve for servicing. Another embodiment includes a dispensing valve that can be reversed and still properly divert fluid into a dispersant chamber. Another embodiment includes an inline dispersal valve with a bleed valve positioned to allow one to bring the air volume in the dispersant chamber to the proper level.

5 Claims, 9 Drawing Sheets

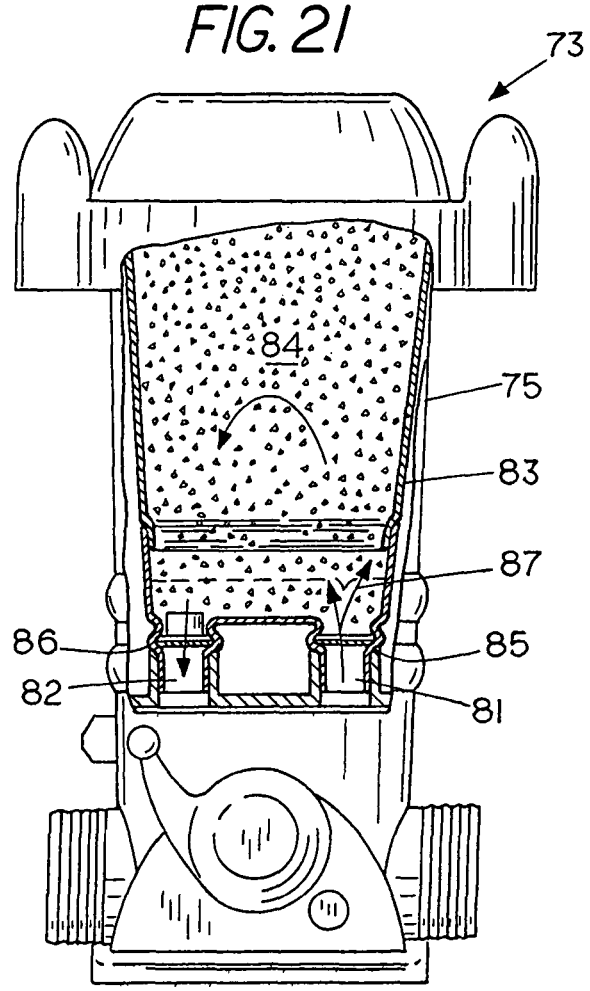

INLINE DISPERSAL VALVES

CROSS REFERENCE TO RELATED APPLICATIONS

This application is a divisional of U.S. application Ser. No. 11/128,124 filed on May 12, 2005 Titled DISPENSERS (now U.S. Pat. No. 7,604,018).

FIELD OF THE INVENTION

The inventions described herein relate generally to dispersal valves and, more specifically, to inline dispersal valves with one or more features that can enhance the inline dispersal valve.

STATEMENT REGARDING FEDERALLY SPONSORED RESEARCH OR DEVELOPMENT

None

REFERENCE TO A MICROFICHE APPENDIX

None

BACKGROUND OF THE INVENTION

The present invention relates to dispersal valves for controllably dispensing materials into a fluid. One such application is in dispensing materials into a body of water to bring the water to the proper condition. For example, one might want to dispense material into the body of water so that the water is fit for consumption or one might want to dispense material into a body of water such as found in swimming pools, hot tubs, spas, jetted bath tubs and the like so that the water is fit for recreational use. In still other applications one might want to add dispersants to control the content of the industrial fluids. Generally the inline dispersal valve includes a selector or control valve so that the amount of the fluid flowing through a dispersant chamber in the dispersal valve can be changed in accordance with the needs of the system.

Inline dispersal valves, which are known in the art, generally direct a main stream through the valve and then remove a portion of a stream which is directed through a dispersant chamber in the dispersal valve and then returned with the dispersant therein to the main stream so that the dispersant can be carried into a body of fluid with the main stream. As the inline dispersal valves require periodic replenishment of the dispersant and the dispersal valve covers are tightly sealed to prevent leakage such valves generally require special tools to remove the dispersal valve cover so one can insert fresh dispersant into a dispensing chamber in the dispersal valve. One embodiment of the invention eliminates the need for special tools to open or close the valve.

In general, inline dispersal valves have a limited operating range since the ability to control the diverted fluid i.e. the amount of fluid flowing through the dispersant chamber changes as the volume of the main fluid flowing through the dispersal valve changes. As a result one might have to use two or more dispersal valves to obtain a proper dispersal rate in a larger system. One embodiment of the invention allows one to properly dispense materials over a wide range of flow conditions thus minimizing the need for multiple inline dispersal valves.

A further difficulty with prior art dispersal valves is that it is difficult to prevent fluid from flowing through the dispersant chamber without completely shutting off the main flow of fluid through the dispersal valve. Consequently, dispersant continues to be dispensed even though the control member on the dispersal valve has been shut off. One embodiment of the invention allows one to substantially shut off the flow rate through the dispersant chamber even though fluid continues to flow through the main line of the valve.

Inline dispersal valves generally have some type of rotatable control member that a user rotates to direct the proper amount of fluid through the dispersal chamber in the valve. In general the rotatable members have an inherent frictional resistance to rotation so that the control member remains at the selected setting under flow conditions. This inherent frictional resistance can make it difficult for a user to adjust the setting of the dispersal valve. One embodiment of the invention allows one to quickly and easily set the rotatable control member to the proper setting though a lever handle that can also function as indicator of the flow condition through the dispersal valve.

One of the difficulties with inline dispersal valve is the initial adjustment of the volume of air within the dispensing chamber so that the correct amount of dispersant is in contact with the dispersant in the chamber. One embodiment of the invention allows one to quickly set the air volume in the dispersant chamber through a bleed valve, which is positioned so that the proper amount of air is in the dispersant chamber during operation of the dispersal valve.

An advantage of the present invention is that the dispersal valve can be used with or without a base. Thus if a system requires a base mount the dispersal valve can be mounted to the system with a base. However, if the dispersal valve is to be part of a system where a base is not required the base can be left off the valve without having an effect on the function of the dispersal valve.

In general dispersal valves tend to be one directional in that to dispense a material the dispersal valve includes a main inlet and a main outlet with the fluid entering the inlet and being discharged through the main outlet. Consequently, if the dispersal valve is installed backwards the flow through the dispensing chamber in the dispensing valve is improper. In one embodiment the invention provides a bi-direction flow dispersal valve that allows one to properly dispense a dispersant regardless of the direction of main flow through the dispersal valve. This feature allows one to use one dispersal valve for different types of installations. That is, a system having pipes located against a wall would require that the dispersal valve control valve face outward so a user has access to the control valve. However, if the flow direction in the pipes is such that the control member would face the wall when the flow direction through the dispersal valve is matched with the flow direction in the pipe system one would need to change the pipe system or use a different valve. In the present invention the dispersal valve can be rotated 180 degrees to accommodate the flow direction of the pipe system thus allowing the control member not to face the wall thereby providing a control member that is accessible to the user.

DESCRIPTION OF THE PRIOR ART

U.S. Pat. No. 4,249,562 shows an apparatus for dispersing material into a fluid stream with the apparatus having a housing with a bottom section that attaches to a pipeline and a top section having a recess for a porous container to support a solid fluid soluble material.

U.S. Pat. No. 4,270,565 shows an apparatus for controllably dispersing materials into a fluid stream with the apparatus having a housing with a bottom section that attaches to a pipeline and a top section having a recess for a porous container to support a solid fluid soluble material.

U.S. Pat. No. 4,331,174 shows an apparatus for controllably dispersing material into a fluid stream with the apparatus having a housing with a bottom section having a cylindrical sleeve with a porous container therein to support a solid fluid soluble material.

U.S. Pat. No. 4,662,387 shows an inline dispersal valve for metering the amount of material that is dispersed into a fluid stream, the inline dispersal valve comprising a chamber for a removable canister for holding materials to be dispersed into a fluid stream, a cover for enclosing the chamber, and a rotatable member having openings for controlling, restricting, and directing fluids away from a fluid stream and through the chamber.

U.S. Pat. No. 5,076,315 shows a dispersal valve and canister with the dispersal valve resiliently supporting a loaded canister in the dispersal valve.

U.S. Pat. No. 5,218,983 shows a dispersal valve and canister with the dispersal valve resiliently supporting a loaded canister in the dispersal valve.

U.S. Pat. No. 6,190,547 shows improved water treatment minerals and a canister having a divider platform for use in a dispersal valve to enable a fluid mixing stream to be bifurcated and simultaneously but separately treat the water flowing therethrough with the water treatment composition containing bacteria killing chemicals and bacteria killing minerals.

U.S. Pat. No. 6,358,425 shows a pool apparatus that simultaneously removes debris from the water and purifies water in a portion of the water passing through the pool apparatus with the pool apparatus having an intake head for drawing water and debris from a first region of the pool and directing the water and debris to a housing having a restrictor therein for directing a portion of the water through a water purification material and the remaining portion with the debris therein along an unimpeded path in the housing to a collector where the debris is collected and the water is returned to the pool.

U.S. Pat. No. 6,544,415 shows containers for used in dispersal with the containers enabling a fluid-mixing stream to separately and controllably disperse two different water treatment materials into a water treatment system.

SUMMARY OF THE INVENTION

The embodiments of the inventions include an inline dispersal valve that can be used with or without a base. One embodiment includes a rotatable member that is rotatable from a fluid stream obstructing condition to an out-of-the way condition to prevent fluid from being diverted into the dispersal valve. Another embodiment includes a lever handle for quickly setting the amount of fluid being diverted into the inline dispersal valve. Another embodiment includes an indicator that can be viewed from a position above the inline dispersal valve. Another embodiment includes a cap that can be secured or removed without the aid of tools. Another embodiment includes a clip that allows one to disassemble the inline dispersal valve for servicing. Another embodiment includes a dispensing valve that can be reversed and still properly divert fluid into a dispersant chamber. Another embodiment includes an inline dispersal valve with a bleed valve positioned to allow one to bring the air volume in the dispersant chamber to the proper level.

BRIEF DESCRIPTION OF THE DRAWINGS

FIG. 21 is a partial cross-sectional view showing the inline dispersal valve of FIG. 20 supporting a removable canister containing a dispersant therein.

DESCRIPTION OF THE PREFERRED EMBODIMENT

FIGS. 1 and 2 show an inline dispersal valve 10 having a housing 11. Housing 11 includes a chamber 14 located within housing 11, the chamber 14 functioning for supporting a dispersant 15 therein. It is noted that the dispersant 15 can comprise a plurality of dispensable materials including but not limited to fluid conditioning materials and fluid purification materials. It is noted that the inline dispersal valve 10 also includes a cover 13 for enclosing the chamber 14 of the housing 11.

The inline dispersal valve housing 11 further includes a fluid conduit 16 to allow for the flow of a fluid stream therethrough, a portion of the fluid stream of which is directed through the chamber 14 via a fluid port 39 (shown in FIG. 9) when the fluid port 39 is in an open condition. In the embodiment of FIGS. 1 and 2, the inline dispersal valve housing 11 is shown as including a receptacle and more specifically a cylindrical shape housing 17 for receiving a rotatable member 18 therein, the rotatable member 18 functioning to rotatably open and close fluid port 39. A feature of inline dispersal valve 10, as shown in FIG. 2, is that the fluid conduit 16 and the cylindrical receptacle 17 are position within the housing 11 of the inline dispersal valve 10 so as to at least partially intersect each other.

Figure 1:
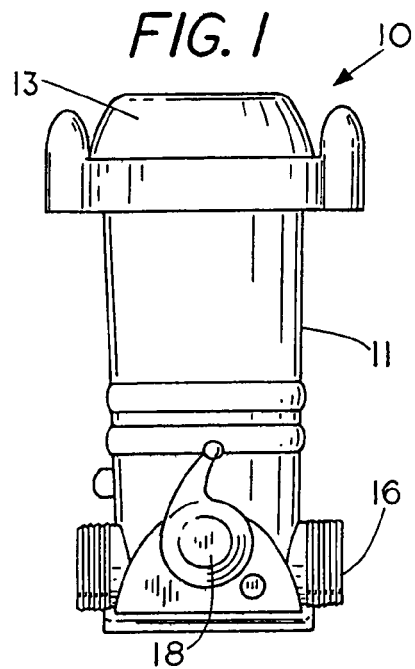
FIG. 1 shows a front view of an inline dispersal valve.
Figure 2:
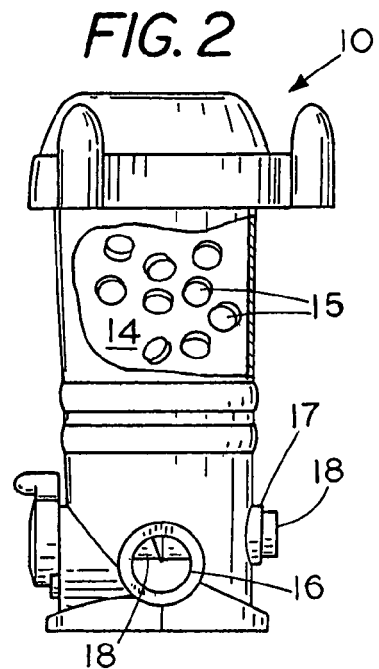
FIG. 2 shows a partial cross-sectional view of the inline dispersal valve of FIG. 1 having a dispersant supported therein.
Figure 3:
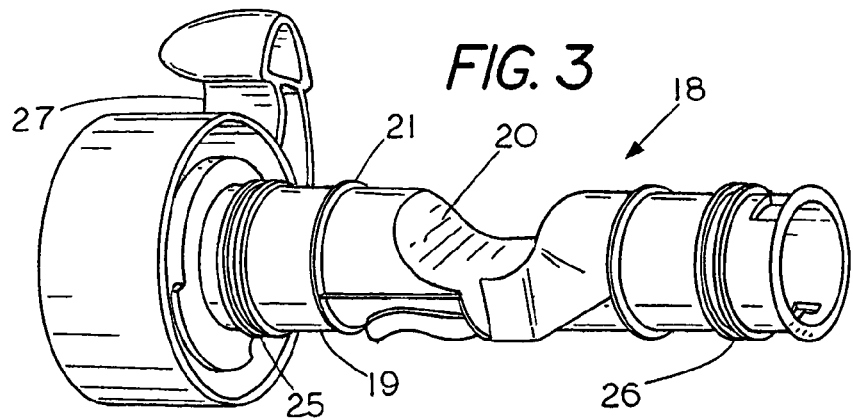
FIG. 3 shows a perspective view of a rotatable member.
Figure 4:
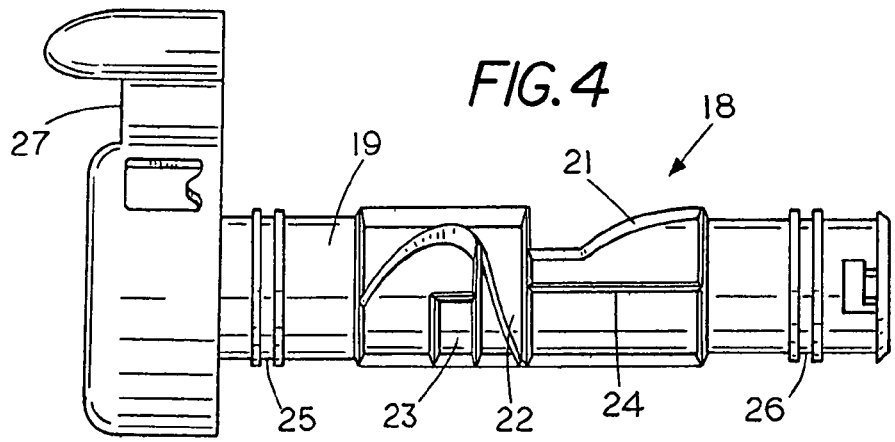
FIG. 4 shows a side view of the rotatable member of FIG. 3.
Figure 5:
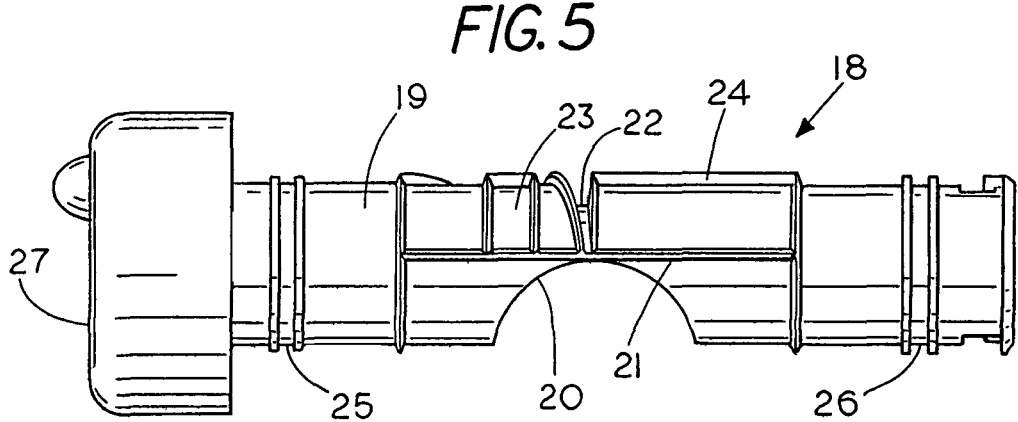
FIG. 5 shows an alternative side view of the rotatable member of FIG. 3.

Referring to FIGS. 3, 4, and 5, FIG. 3 shows a perspective view, FIG. 4 shows a side view and FIG. 5 shows an alternative side view of a rotatable member 18 of FIG. 1 and FIG. 2.

As shown in FIGS. 3, 4, and 5, rotatable member 18 comprises a body having a cylindrical surface 19 mateable with a receptacle of a housing of an inline dispersal valve similar to the cylindrical receptacle 17 of housing 11, and more specifically with a surface (not shown) of the receptacle of the inline dispersal valve housing for forming rotational engagement with a chamber of the inline dispersal valve housing. Rotatable member 18, as shown in FIGS. 3 and 5, includes a fluid deflecting surface 20. It is noted that similar to the rotatable member 18 of FIGS. 1 and 2, a feature of the rotatable member 18 is that the rotatable member 18 has an axis of rotation extending transverse to a flow direction through a conduit of the inline dispersal valve housing. The aforementioned enables at least a portion of the fluid deflecting surface 20 of rotatable member 18 to be rotatingly displaceable into a lumen in fluid conduit 16 so as to extend at least partially transverse to the flow direction of the fluid stream moving through fluid conduit 16 thereby enabling fluid deflecting surface 20 to obstruct the lumen and divert at least a portion of a fluid flowing in the fluid conduit 16 to flow through chamber 14 before returning back to fluid conduit 16. The fluid diverted through the chamber 14 facilitates the dispensing of the dispersant 15 supported in chamber 14.

It is noted that a feature of the rotatable member 18 is that the fluid deflecting surface 20 of rotatable member 18 is displaceable out of the lumen in the fluid conduit 16 to thereby form a portion of the fluid conduit 16 to direct fluid through the fluid conduit 16 without diverting fluid into the chamber of the inline dispenser housing, thereby inducing or creating a no flow condition through the chamber.

Note that a feature of the fluid deflecting surface 20 of rotatable member 18 is that fluid deflecting surface 20 also comprises a shape that forms a portion of the fluid conduit of the inline dispersal valve when the fluid deflecting surface 20 is displaced out of the lumen in the conduit. For example, as shown in the embodiment of FIGS. 3 and 5, the fluid deflecting surface 20 of rotatable member 18 can comprise a shape having a radius of curvature substantially the same as a radius of curvature of the fluid conduit of the inline dispersal valve housing such as the inline dispersal valve 10 of FIGS. 1 and 2 to thereby establish an uninhibited flow condition therethrough when the fluid deflecting surface 20 is displaced out of the lumen to prevent the diversion of fluids from the fluid stream into the chamber of the housing to thereby create or create a no flow condition through the chamber.

Referring to FIGS. 3, 4, and 5, rotatable member 18 includes a guard or ridges 21 surrounding the fluid deflecting surface 20, guard 21 functioning to restrict and confine the movement of the fluids directed into the chamber from the fluid stream to the fluid port of the chamber when fluid deflecting surface 20 is extended transverse to the flow direction of conduit as well as to provide a bearing surface against receptacle housing 17.

The rotatable member 18 as shown in the embodiment of FIGS. 3, 4, and 5 also includes at least one channel located on the cylindrical surface 19 of the rotatable member 18 for providing proportional and uniform displacement of the fluids and dispersant exiting the chamber into the fluid conduit when fluid deflecting surface 20 is displaced within the lumen transverse to the flow direction of the fluids flowing through the conduit. Providing for proportional and uniform displacement, of the fluids and dispersant exiting the chamber of the line dispersal valve housing enables the dispersant that is carried out of the chamber by the fluids exiting the chamber to be controllably and broadly distributed into the fluid stream. In FIGS. 4 and 5, rotatable member 18 is shown as having multiple channels comprising a first V-shaped channel 22 and a second elongated channel 23 located on the cylindrical surface 19 of rotatable member 18, channels 22 and 23 providing proportional and uniform displacement of fluids and dispersant exiting the chamber of the inline dispersal valve housing into the fluid stream when fluid deflecting surface 20 is displaced within the lumen of the fluid conduit transverse to the flow direction of the fluids flowing through the fluid conduit.

The rotatable member 18 also includes a barrier 24 located on the cylindrical surface 19 of the rotatable plug, barrier 24 functioning to block fluids and/or dispersant from exiting the chamber of the inline dispersal valve into the fluid conduit via an outlet of chamber (not shown) when the fluid deflecting surface 20 of the rotatable member 18 is displaced out of the lumen of the fluid conduit. Rotatable member 18 further includes a set of circumferential slots 25 and 26 located proximal the ends of the rotatable member 18, the circumferential slots 25 and 26 for receiving a set of circumferential seals therein to provide for a leakage-proof seal when rotatable member 18 is received within cylindrical receptacle of the inline dispersal valve housing.

Referring to FIG. 6, FIG. 6 shows a perspective view of an embodiment of a lever arm handle 27 extending radially outward from a portion of a circumferential housing 29 that engages rotatable member 18 to facilitate ease in rotating the circumferential housing 29 and rotatable member 18. As shown in FIG. 6, a feature of the lever arm handle 27 is that lever arm handle 27 extends in a tangential direction on one side of the lever arm handle 27 so a force for moving circumferential housing 29 in a direction to close a fluid port of a chamber of an inline dispenser valve housing and also to move a fluid deflecting surface 20 of the rotatable member 18 out of a flow diverting condition requires a circumferential force on the lever arm handle 27. Conversely, a force for moving the circumferential housing 29 in an opposite direction to open the fluid port of the chamber of the inline dispenser valve housing and also to move the fluid deflecting surface 20 of the rotatable member 18 into a flow diverting condition requires both a radial force and a circumferential force on the lever arm handle 27.

In the embodiment of FIG. 6, lever arm handle 27 is shown as also having a finger grasping region 28 with finger grasping region 28 comprising a shape that conforms to the natural curvature of the user's hand to help enhance the user's grip of lever arm handle 27.

In further regards to FIG. 6, note that FIG. 6 also shows circumferential housing 29 as having a fluid port indicator 30 for enabling a user to meter the dispensing of the inline dispenser valve by viewing and selecting a fluid port setting from a position above the inline dispersal valve housing through the rotation of the circumferential housing 29 via the lever arm handle 27.

In regards to the fluid port indicator 30, in the embodiment of FIG. 6 the fluid port indicator 30 is shown as comprising a semi-circular number plate 31, which is affixed to valve 10 and positioned within an interior surface of circumferential housing 29. Number plate 31, as shown in the embodiment of FIG. 6, contains a set of dial numbers 32 thereon with each number in the set of dial numbers 32 on the number plate 31 corresponding to a specific size of the opening of the fluid port of the chamber of the inline dispersal valve housing as well as a specific position of deflecting surface 20. The numbers in the set of dial numbers 32 are each separately viewable through a window 33 in circumferential housing 29. By rotating the circumferential housing 29 in a clock-wise or counter clock-wise direction it allows the user to adjust the flow of fluids through the chamber of the inline dispersal valve to a desired level by controlling the size of the fluid port as well as the position of the deflecting surface 20. In further regards to the set of dial numbers 32, it is noted that the set of dial numbers 32 can be placed on number plate 31 through a variety of methods including but not limited to being stamped on, molded on and imprinted on number plate 31 so as to be readily visible to a viewer who may be at an arm's length from the lever handle 27.

Figure 6:
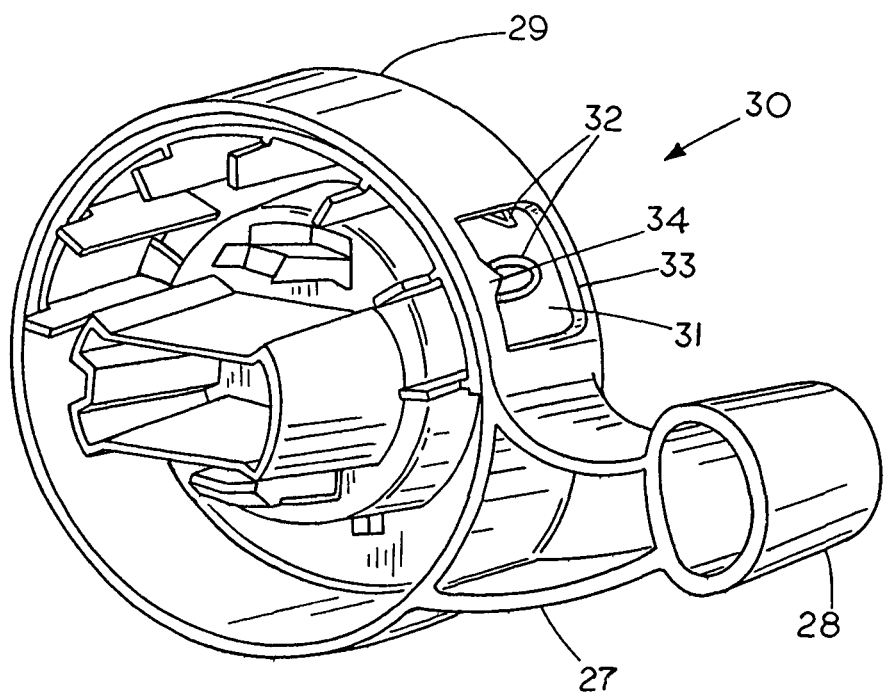
FIG. 6 shows a perspective view of a lever arm handle.

In further regards to the fluid port indicator 30 of FIG. 6, it is noted that the window 33 of the fluid port indicator 30 further includes a marker 34 located thereon to further increase the precision of the settings.

Figure 7:
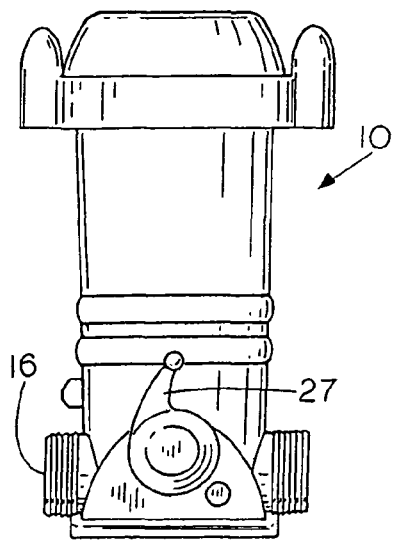
FIG. 7 shows a front view the inline dispersal valve in an open condition.
Figure 8:
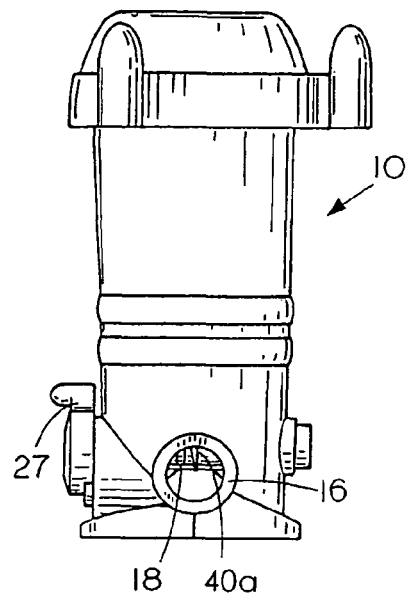
FIG. 8 shows an end view of the inline dispersal valve of FIG. 7.
Figure 9:
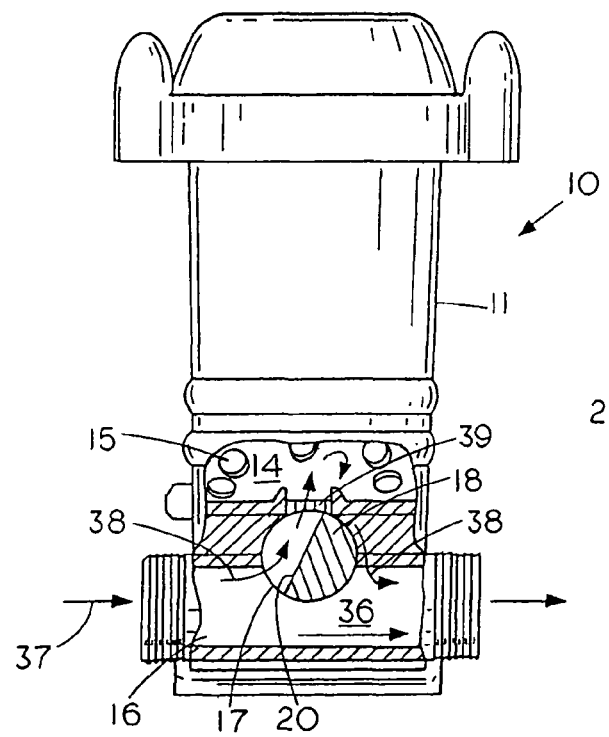
FIG. 9 shows a partial cross-sectional view of inline dispersal valve of FIG. 7 in use in the open condition.

Referring to FIGS. 7, 8, and 9, FIG. 7 shows a front view and FIG. 8 shows an end view of the inline dispersal valve 10 of FIGS. 1 and 2 in an open condition. FIG. 9 shows a partial cross-sectional view of inline dispersal valve 10 of FIGS. 1 and 2 in use in the open condition.

As shown in FIG. 9, when inline dispersal valve 10 is in use in the open condition, rotatable member 18 is positioned within cylindrical receptacle 17 in a condition in which at least a portion of a fluid deflecting surface 32 of the rotatable member 18 is displaced in a lumen 36 of the fluid conduit 16 of the inline dispersal valve 10 and extending transverse to the direction of the fluid flow of conduit 16.

The aforementioned results in the at least partial obstruction of a fluid stream 37 flowing through conduit 16. The at least partial obstruction of the fluid stream 37 by the fluid deflecting surface 20 result in the diversion of at least a portion of the fluids 38 from the fluid stream 37 into chamber 14 via fluid port 39. As the fluids 38 enters chamber 14 the fluids 38 comes into contact with the dispersants 15 supported within chamber 14 during which a portion of the dispersants 15 are dispensed into the fluids 38.

It is noted that as inline dispersal valve 10 is maintained in the open condition during use, the fluid deflecting surface 20 continues to direct fluids 38 into chamber 14. The continuous flow of fluids 38 into chamber 14 eventually forces the fluid 38 lingering in chamber 14 along with the dispersants 15 out of the chamber 14 via a chamber outlet (not shown) and back into fluid conduit 16. As the fluid 38 and the dispersants 15 exit the chamber outlet (not shown), fluid 38 and the dispersants 15 are then proportionally and uniformly displaced into fluid conduit 16 by at least one channel 40*a* located on the surface of rotatable member 18, channel 40*a* similar to the channels 21 and 22 of the rotatable member 18 of FIGS. 3, 4, and 5.

In further regards to FIGS. 7, 8, 9, and 10, note that FIGS. 7, 8, 9, and 10 also show lever handle 27 comprising a pointer to indicate a rotational position of the fluid deflecting surface 20. More specifically, FIG. 7 shows that when the fluid deflecting surface 20 is at least partially located in the lumen 36 of the fluid conduit 16, the lever handle 27 is shown positioned midway between conduit 16 or pointing at a perpendicular angle to the direction of the fluid conduit 16. FIG. 10 shows that when the fluid deflecting surface 20 is displaced from the lumen 36 of the fluid conduit 16, the lever handle 27 is shown positioned towards an end of conduit 16 or pointing at a slanted angle to the direction of the fluid conduit 16.

Referring to FIGS. 10, 11, and 12, FIG. 10 shows a front view and FIG. 11 shows an end view of the inline dispersal valve 10 of FIGS. 1 and 2 in a closed condition. FIG. 12 shows a partial cross-sectional view of inline dispersal valve 10 of FIGS. 1 and 2 in use in the closed condition.

Referring to the fluid deflecting surface 20 of rotatable member 18, it is noted that in the closed condition the fluid deflecting surface 20 has a radius of curvature substantially the same as a radius of curvature of the conduit 16 when the inline dispersal valve 10 of the present invention is in use in the closed condition. Due to the aforementioned, when the inline dispersal valve 10 is in use in the closed condition, the rotatable member 18 is positioned within the cylindrical receptacle 17 in a condition in which the fluid deflecting surface 20 of the rotatable member 18 is displaced out of the lumen 36 of the fluid conduit 16 with fluid deflecting surface 20 forming a portion of the fluid conduit 16 to direct fluid stream 37 through fluid conduit 16 without diverting a portion of the fluid stream 37 into the chamber 14 of the inline dispersal valve housing 11. The aforementioned serves the dual purpose of blocking off the fluid port 39 with the cylindrical surface 18 of rotatable member 18 while also clearing fluid conduit 16 of obstruction by the fluid deflecting surface 20 to prevent potential diversion of fluids from fluid stream 37 into chamber 14 to thereby create a no flow condition through the chamber 14. Since fluids cannot enter or exit the chamber 14 when inline dispersal valve 10 is in the closed condition, the aforementioned thus prevents the dispensing of dispersants 15 supported within chamber 14 into fluid conduit 16.

In further regards to FIGS. 9 and 12, it is noted that although FIGS. 9 and 12 show fluid port 30 as comprising one size, alternative embodiments of the dispersal valve housing can include a fluid port comprising of variable sizes.

Referring to FIGS. 13, 14, and 15A, FIG. 13 shows a top perspective view, FIG. 14 shows a bottom perspective view, and FIG. 15A shows a cross-sectional view of an embodiment of a dispersal valve housing cover 40. The cover, as shown in FIGS. 13 and 14 comprises three components, namely a cap 41, a cover housing 42, and a cap-retention ring 43.

FIG. 15 further shows a perspective view of the cap 41 of dispersal valve housing cover 40. The cap 41 as shown in FIG. 15 includes a seat region 44 extending from the cap 41 engaging the top of dispenser housing 11. The cover housing 42, as shown in FIG. 14, includes an interior surface 45 having female threads 46 located thereon for engagement with male threads on dispenser housing 11 (not shown) located proximal an open end of an inline dispersal valve housing. A sealing ring 49 is located in the seat region 44 to form a seal between the cover housing 42 and the dispenser housing 11.

When the cover housing 42 is supported on the seat region 44 of the cap 41, the cover housing 42 is axially restrained to the cap 41 but freely rotatable with respect to the cap 41. In the embodiment of the dispersal valve housing cover 40 of FIG. 13, the cover housing 42 is shown as including cap retention ring 43 removably securable to the exterior surface of the cap 41 through the engagement of a set of flexible flanges 47 located thereon with a set of receiving sites 48 located on the exterior surface of the cap 41 (more clearly shown in FIG. 15) for axially restraining the cover housing 42 to the cap 41 while still allowing for the free rotation of the cover housing 42 with respect to the cap 41.

In use, when the dispersal valve housing cover 40 is placed on an open end of the dispersal valve housing with the female threads 46 of the cover housing 42 engaging the male threads (not shown) of the dispersal valve housing, rotation of the cover housing 42 in a first direction results in the movement of a portion of the cap 41 into a locking fluid tight engagement with the open end of an inline dispersal valve housing to provide for fluid tight enclosure of the chamber of the dispersal valve housing. The rotation of the cover housing 42 in an opposite direction, conversely, results in the rotationally unlocking of the dispersal valve housing cover 40 from the dispersal valve housing and eventual removal of the cap 41 from the dispenser valve housing to provide the user access to the chamber of the dispersal valve housing.

Figure 14:
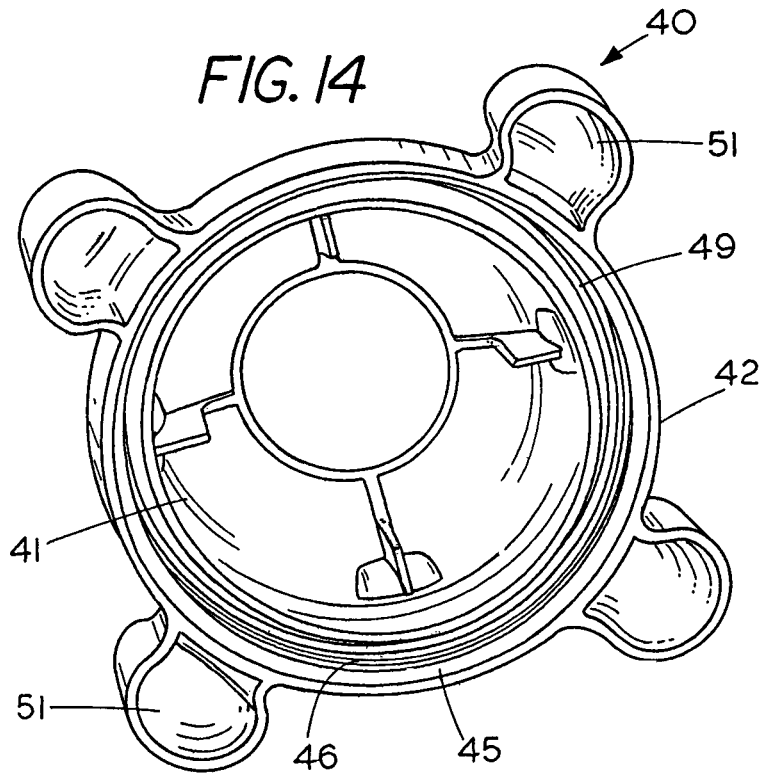
FIG. 14 shows a bottom view of the dispersal valve housing cover of FIG. 13.
Figure 15:
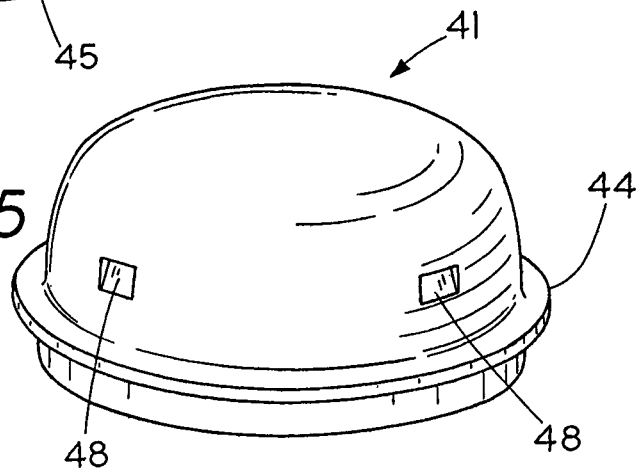
FIG. 15 shows a perspective view of the cap of the dispersal valve housing cover of FIG. 13.
Figure 15A:
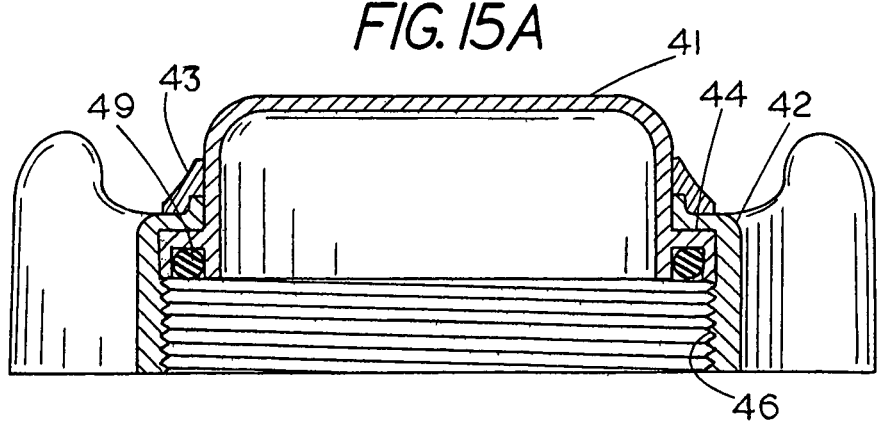
FIG. 15A shows a cross-sectional view of the dispersal valve housing cover of FIG. 13.

Referring to FIG. 14 and FIG. 15A, in order to enhance the fluid tight seal between the dispersal valve housing cover 40 and the open end of the dispersal valve housing, the portion of the cap 41 that is moved into fluid tight engagement with the open end of the inline dispersal valve housing is further provides with a compressible resilient sealing ring supported on the underside of seat region 44.

Referring back to FIGS. 13, 14, and 15A, note that the cover housing 42 of dispersal valve housing cover 40 also includes a set of four radial protruding handles 50 circumferentially spaced on cover housing 42 and extending therefrom to enable the user to bring the cap 41 into and out of engagement with the open end of the dispersal valve housing through rotation of the cover housing 42. Each of the radial protruding handles 50 are located on a diameter extending through an axis of rotation of the cover housing 42. By having handles positioned opposite each other one can provide a balanced rotational force to cover housing 42. It is noted that in the present embodiment, the removal force region, that is the region on the radial protruding handles 50 for receiving a force to remove the cap 41 from the dispersal valve housing is also located radially outward from the cover housing 42 to provide leverage to the user.

Figure 13:
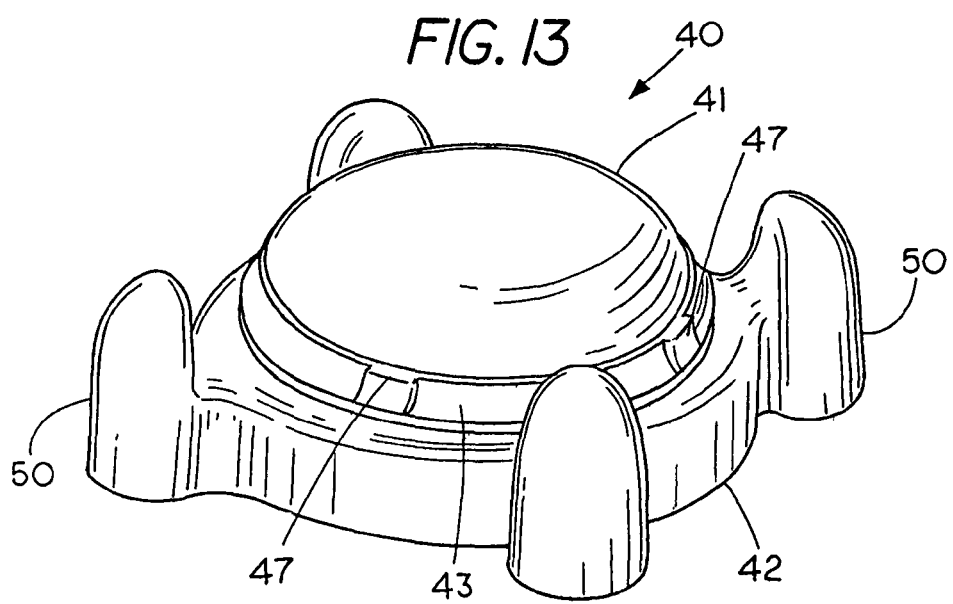
FIG. 13 shows a perspective view of a dispersal valve housing cover.

Although each of the radial protruding handles 50 of the dispersal valve housing cover 40 can be separately secured to the cover housing 42, in the embodiment of FIGS. 13 and 14, the radial protruding handles 50 are each shown integrally formed to the cover housing 42. It is further noted that in the embodiment of FIGS. 13 and 14, the radial protruding handles 50 of the dispersal valve housing cover 40 are shown as each having a hollow interior 51. The radial protruding handles 50 of the dispersal valve housing cover 40 are also shown as each comprising an ergonomic handle having a shape that conforms to the natural curvature of the user's hand in order to improve user conform while further enhancing the user's ability to grip the handles 50.

In further regards to the radial protruding handles 50 of dispersal valve housing cover 40, it is noted that although the number of handles can vary in alternative embodiments of the housing, the present embodiment shows the cover housing 42 as having four radial protruding handles 50 extending therefrom along a major diameter of housing 42 to enable a user to rotate the cap 41 into and out of engagement with a dispenser housing by rotation of the cover housing 42.

Figure 16:
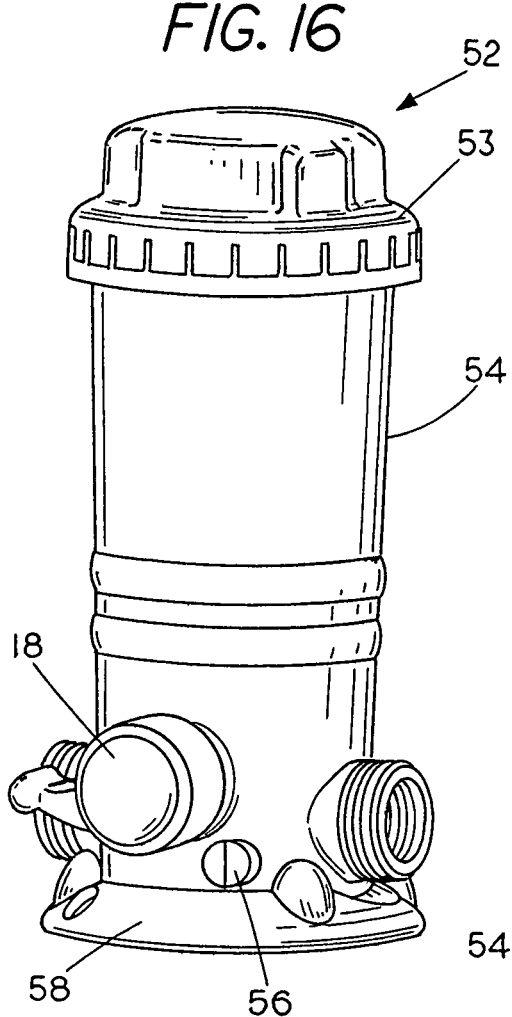
FIG. 16 shows a front view of an alternative embodiment of an inline dispersal valve.
Figure 17:
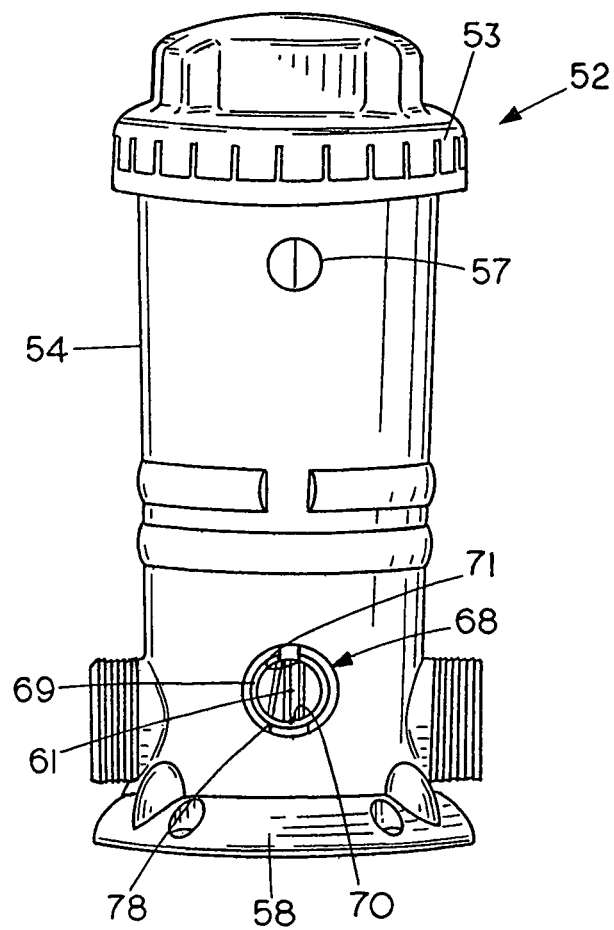
FIG. 17 shows a back view of the inline dispersal valve of FIG. 16.

Referring to FIGS. 16 and 17, FIG. 16 shows a front view and FIG. 17 shows a back view of an alternative embodiment of inline dispersal valve. As shown in FIGS. 16 and 17, inline dispersal valve 52 is similar to the inline dispersal valve 10 of FIGS. 1 and 2. However, unlike inline dispersal valve 10, inline dispersal valve includes a molded one-piece cover 53 for enclosing the interior of a housing 54 of the inline dispersal valve 52.

Inline dispersal valve 55 also includes a drain valve 56 (shown in FIG. 16) and a bleed valve 57 (shown in FIG. 17) for resolving dispersal issues. For example, during use of prior art inline dispersal valve, an air pocket may be present in the housing 54. If the air pocket in the chamber in housing 54 is too large it hinders the dispensing of the dispersant supported within the chamber by preventing the fluids directed into the chamber from coming into contact with the dispersant located in the air pocket. Bleed valve 57 functions to alleviate the aforementioned problem by purging the trapped air pocket out from the chamber of the inline dispersal valve housing 52 to allow fluids directed in the chamber of inline dispersal valve housing 52 to come into contact with a majority of the dispersant supported therein. The elevation of bleed valve 57 is such that the air in the housing can be bled until the fluid level reaches the bleed valve 57. At this point the bleed valve 57 is closed leaving an air pocket above the level of the bleed valve 57.

Figure 18:
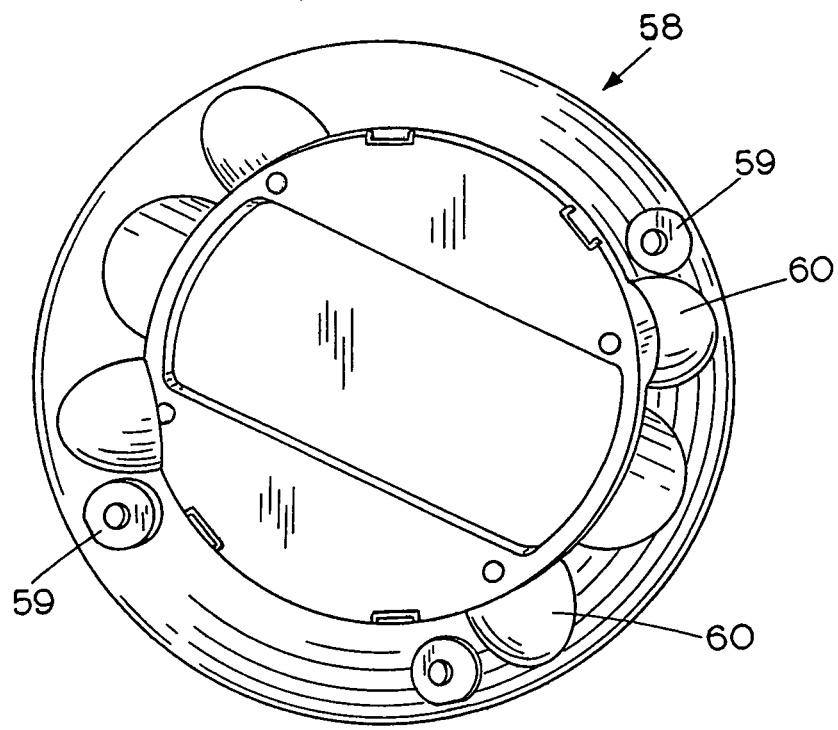
FIG. 18 shows a top view of a base of the inline dispersal valve of FIGS. 16 and 17.

Referring to FIG. 18, FIG. 18 shows a top view of a base 58 of the inline dispersal valve 52 of FIGS. 16 and 17 for removably supporting the inline dispersal valve housing 54 thereon. The base 58 of FIG. 18 is shown having fastening regions 59 thereon for the securement of the inline dispersal valve housing 54 thereon via fasteners such as but not limited to bolts and screws. The base 58 of FIG. 18 also includes a set of ears 60 located thereon for providing additional support and stability for the inline dispersal valve housing 54. It is noted that a feature of the base 52 is that unlike the inline dispersal valve housing 54 which comprises a material having sufficient rigidity to handle the pressure requirements of the fluids and the fluid and dispersant mixtures therein, the base 52 of the inline dispersal valve 52 can comprise a material having less rigidity than the inline dispersal valve housing 54 to provide an enhance shock resistance support for the dispersal valve.

Figure 19:
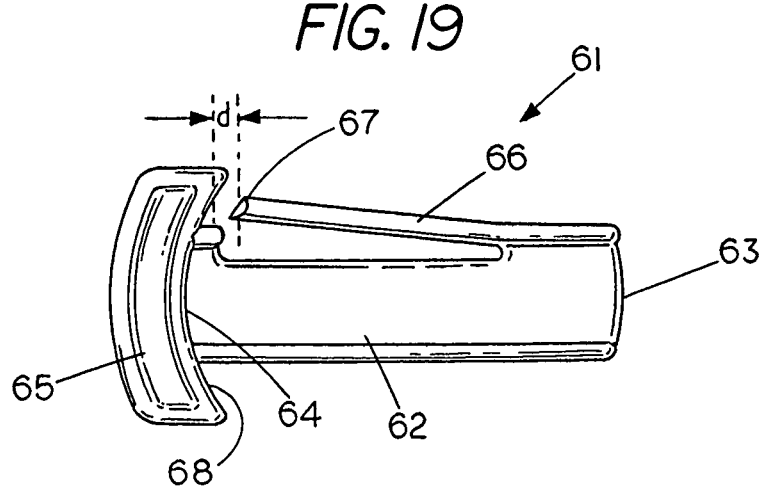
FIG. 19 shows a clip member for lockingly securing a rotatable member to an inline dispenser housing.
Figure 19A:
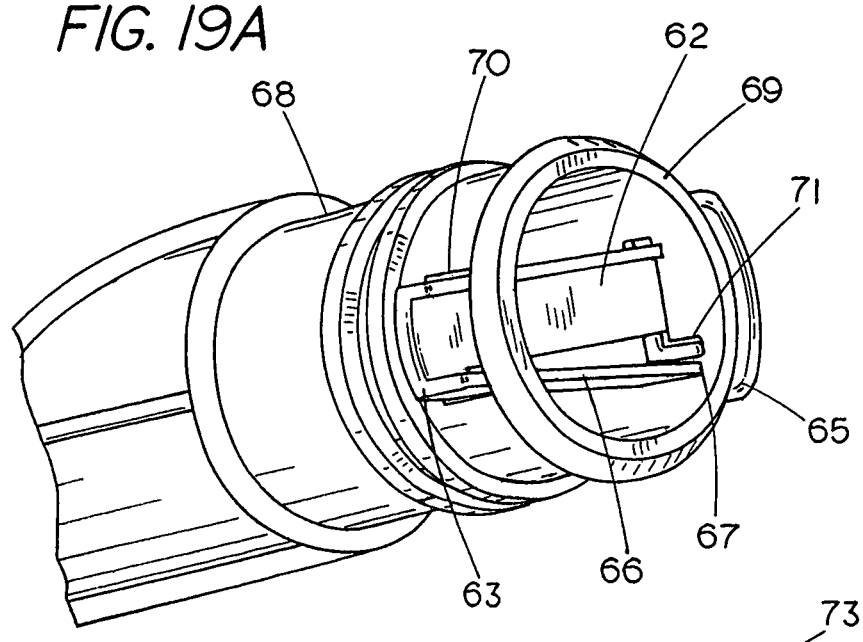

Referring to FIG. 19, FIG. 19 shows an embodiment of a clip member 61 for lockingly securing a rotatable member such as a rotatable member 68 of FIGS. 16 and 17 to an inline dispenser housing. The clip member 61 comprises a clip body 62 having a first end 63 and a second end 64. The clip member 61 includes a clip head 65 located at the second end 63 of the clip body 62 and a resilient flange 66 branching from the clip body 62 and having a free end 67 extending in a direction towards the clip head 65. The clip head 65 includes a clip head surface 68 conforming to the shape of a surface of the rotatable member that the clip member 61 is lockingly engaging the rotatable member 18.

Although the alternative embodiments can comprise a clip member having a resilient flange branching from different locations on the clip body, the embodiment of FIG. 19 shows the resilient flange 66 branching from proximal the first end 63 of the clip body 62. The free end 67 of the resilient flange 66 is located proximal the clip head 65 with a distance "d" between the free end 67 of the resilient flange 66 and surface 68 of the clip head 65 being sufficient to support a portion of a wall 69 of the rotatable member 68 (shown in FIG. 17) therein. It is further noted however that the distance "d" between the free end 67 of the resilient flange 66 and surface 68 of the clip head 65 should also be sufficient to allow for the first end 63 of the clip body 62 to extend through the second slot and lockingly remain thereat.

Referring back to FIG. 17, note that the rotatable member 68 includes a first slot 70 and a second slot 71 located proximal an end 72 of rotatable member 68 with the first slot 70 and the second slot 71 positioned on the rotatable member 68 in a condition parallel to each other. The parallel positioning of the slots 70 and 71 enable the clip member 61 to simultaneously extend through both the first slot 70 and the second slot 71 of the rotatable member 68.

In use, once rotatable member 68 is assembled to inline dispersal valve housing 54 the first end 63 of the clip body 62 along with the resilient flange 66 is extended through the first slot 70 of the rotatable member 68. The presence of the clip member 61 prevents the displacement of rotatable member 68 from the dispersal valve housing 54. The clip member 61 is lockingly maintained to the slots 70 and 71 of the rotatable member 68 via the engagement of the free end 67 of the resilient flange 66 with a portion of an interior surface of the rotatable member 68, which prevents the clip member 61 from being withdrawn from the slots 70 and 71 of the rotatable member 68.

To remove clip member 61 of the present embodiment from the slots 70 and 71 of the rotatable member 68, the resilient flange 66 is moved towards the clip body 62 to displace the engagement of the free end 67 of the resilient flange 66 with the interior surface of the rotatable member 68 after which the clip member 61 can then be removed from the slots 70 and 71 of the rotatable member 68.

Figure 10:
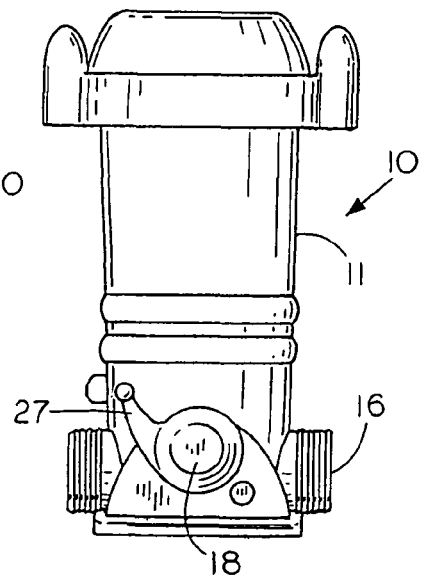
FIG. 10 shows a front view of the inline dispersal valve of FIG. 7 in a closed condition.
Figure 11:
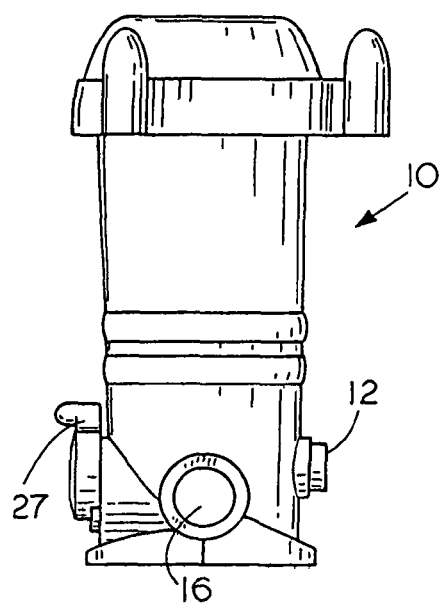
FIG. 11 shows an end view of the inline dispersal valve of FIG. 10 in the closed condition.
Figure 12:
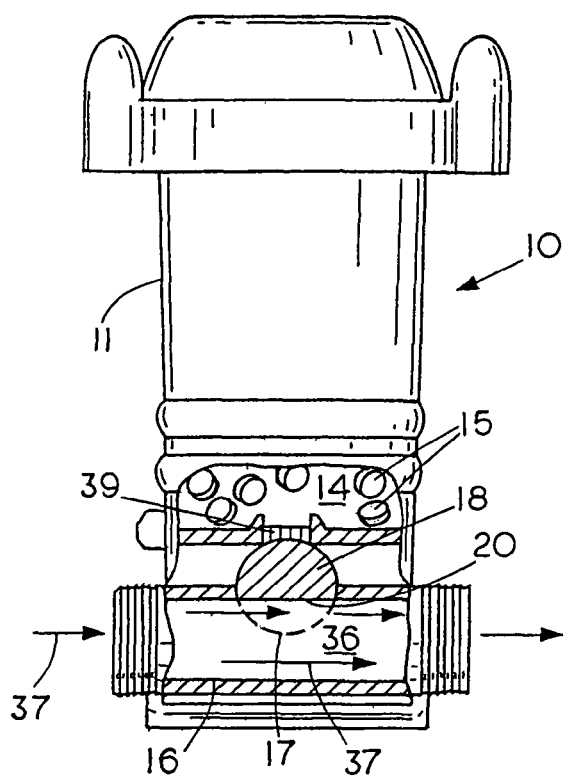
FIG. 12 shows a partial cross-sectional view of the inline dispersal valve of FIG. 10 in use in the closed condition.
Figure 20:
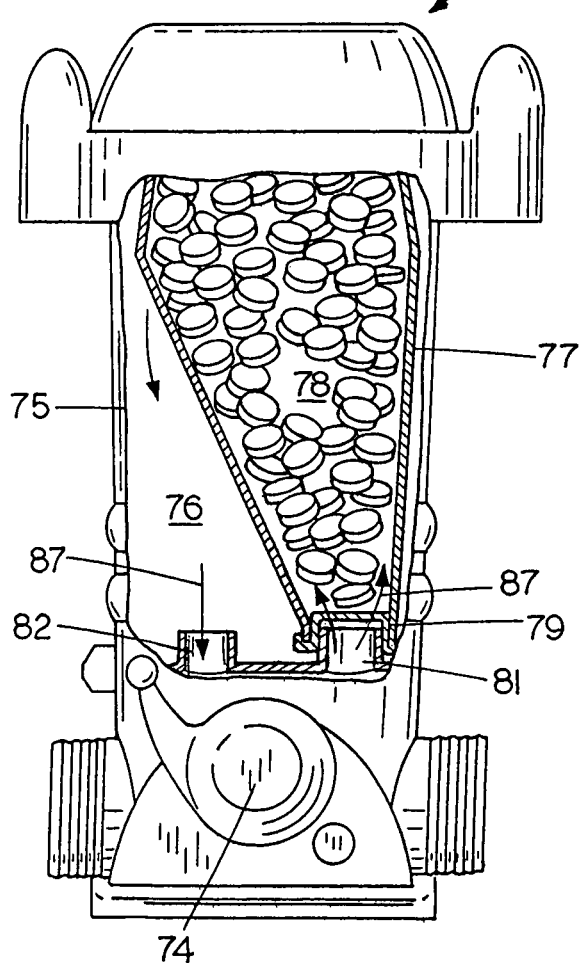
FIG. 20 shows a partial cross-sectional view of an alternative embodiment of an inline dispersal valve supporting a dispersant holding canister therein.

Referring to FIG. 20, FIG. 20 shows a partial cross-sectional view of an alternative embodiment of an inline dispersal valve 73. Inline dispersal valve 73 comprises similar components as the inline dispersal valve 10 of FIGS. 1, 2, 7, 8, 9, 10, 11, and 12 in that inline dispersal valve 73 includes a rotatable member 74 having a fluid deflecting surface (not shown) for directing a portion of a fluid stream through a chamber 76 of a housing 75 of the inline dispersal valve 73. However, unlike inline dispersal valve 10 which in FIGS. 2, 8, and 10 show chamber 14 as solely supporting dispersant 15 therein for dispensing into the fluid stream 37, inline dispersal valve 73 is shown in FIG. 20 as including the use of a removable canister 77 supported within chamber 76 of a housing 75 of inline dispersal valve 73 for supporting a dispersant 78 therein for dispensing into the fluid stream.

More specifically, the chamber 76 of inline dispersal valve 73 is shown as including a chamber inlet 81 for receiving fluids directed therethrough from the fluid stream and a chamber outlet 82 to provide a path for fluids located in the chamber 76 of the housing 75 to return back to the fluid stream.

Referring to canister 77, canister 77 includes a canister fluid inlet port 79 mateable with the chamber inlet 81 and a canister fluid outlet port 80. In the operation of inline dispersal valve 73, a portion of the fluid stream is directed through chamber inlet 81 and into canister 77 where the fluids 87 come into contact with the dispersant 78. The interaction between the fluids 87 and the dispersant results in a portion of the dispersant being dispensed or dissolve into the fluids 87 and is carried out of canister 77 and into the chamber 76 of the inline dispersal valve housing 75 via the canister fluid outlet port 80. Once in chamber 76, the fluid containing the dispensed dispersant is then carried through the chamber outlet 82 into the fluid stream.

Referring to FIG. 21, FIG. 21 is a partial cross-sectional view showing inline dispersal valve 73 supporting a removable canister 83 containing a dispersant 84 within chamber 76 of a housing 75.

Referring to canister 83, canister 83 as shown in FIG. 21 includes a canister fluid inlet port 85 mateable with the chamber inlet 81. However, unlike canister 77, canister 83 also includes a canister outlet port 86 mateable with the chamber outlet 82 of housing 75. In the operation of inline dispersal valve 73, as shown in the embodiment of FIG. 21, a portion of the fluid stream 87 is directed through chamber inlet 81 and directly into canister 83 where the fluids 87 come into contact with the dispersant 84. The interaction between fluids 87 and dispersant 84 results in a portion of the dispersant 84 being dispensed or dissolved into the fluid 87. The fluids 87 along with the dispensed dispersants is eventually carried out of canister 83 via the canister fluid outlet port 80 and directly through chamber outlet 82 into the fluid stream.

It is noted that the inline dispersal valve as disclosed above comprises various components all preferably form from a polymer plastic or the like.

The present application also includes a method of controllably dispensing a dispersant comprising the steps of: (1) moving a fluid stream 37 through a fluid conduit 16 of an inline dispersal valve housing 11; (2) moving at least a portion of a fluid deflecting surface 20 into a lumen 36 of the fluid conduit 16 to divert at least a portion 38 of the fluid stream 37 moving through the conduit 16 to flow through a chamber 14 of the inline dispersal valve housing 11 before returning to the conduit 16 to thereby dispense a portion of the dispersant 15 supported by the chamber 14 into the conduit 16; and (3) moving the portion of the fluid deflecting surface 20 out of the lumen 36 of the fluid conduit 16 to create a no flow condition through the chamber 14.

The above method can also include the steps of (4) moving a lever handle 27 to move the portion of the fluid deflecting surface 20 into or out of the lumen 36 of the fluid conduit 16; (5) opening a drain valve 57 located on the inline dispersal valve housing 11 to remove air trapped within the chamber 14 of the inline dispersal valve housing 11; (6) removing a dispenser cover 40 from the inline dispersal valve housing 11, replenishing the chamber 14 of the inline dispersal valve housing 11 with dispersant 15, and closing the chamber 14 of the inline dispersal valve housing 11 with the dispenser cover 40; (7) filling the chamber 14 of the inline dispersal valve housing 11 with dispersant 15; and (8) replacing a depleted dispersant supporting canister 83 with a fully charged dispersant supporting canister 83.

The present application also includes a method for controlling a fluid flow 37 through a dispenser 10 comprising the steps of: (1) directing a fluid stream through a fluid conduit 16 of an inline dispersal valve housing 11; (2) moving a rotatable member 12 in a direction to open a fluid port 39 of inline dispersal valve housing 11 to allow for at least a portion 38 of the fluid stream 37 flowing through the conduit 16 to flow through the fluid port 39 into a chamber 14 of the inline dispersal valve housing 11 before returning to the fluid conduit 16 to thereby dispense a portion of the dispersant 15 supported by the chamber 14 into the conduit 16; and (3) moving the rotatable member 12 in an opposite direction to close the fluid port 39 to thereby create a no flow condition through the chamber 14.

The above method can also include the step of: (4) moving the rotatable member 12 having a fluid deflecting surface 20 in a direction to open the fluid port 39 of inline dispersal valve housing 11 while simultaneously displacing the fluid deflecting surface 20 into a lumen 36 of the conduit 16 of the inline dispersal valve housing 111 to divert at least the portion 38 of the fluid stream 37 flowing through the conduit 16 to flow through a chamber 14 of the housing 11 before returning to the conduit 16; (5) moving a rotatable member 12 in the opposite direction to close the fluid port 39 while simultaneously displacing the fluid deflecting surface 20 out of the lumen 36 of the conduit 16 to form a portion of the conduit 16 to direct fluids through the conduit 16 without diverting fluid into the chamber 14 of the housing 11 to thereby create a no flow condition through the chamber 14; (6) moving a lever arm handle 27 extending from the rotatable member 12 to facilitate ease in movement of the rotatable member 12 in opening and closing the fluid port 39; and (7) selecting a fluid port setting from a position above the housing 11 by moving the rotatable member 12 via the lever arm 27 while viewing fluid port indicator 33 located on a portion of the lever arm 27.

The present application further includes a method of replacing a rotatable member 12 of an inline dispersal valve housing 11 comprising the steps of: (1) moving a resilient flange 66 of a clip member 61 towards a clip body 62 of the clip member 61 to displace the engagement of a free end 67 of the resilient flange 66 with an interior surface of the rotatable member 12; (2) withdrawing the clip member 61 from a set of slots 70 and 71 of the rotatable member 12; (3) withdrawing the rotatable member 12 from the dispersal valve housing 11; (4) inserting a new rotatable member 12 to the dispersal valve housing 11; (5) extending the first end 63 of the clip body 62 along with the resilient flange 66 through the slots 70 and 71 of the rotatable member 12; and (6) engaging the free end 67 of the resilient flange 66 to the interior surface of the rotatable member 12 to lockingly maintain the clip member 61 to the rotatable member 12.

The present invention can also includes a method of replenishing in inline dispersal valve 10 comprising the steps of: (1) rotating a cover housing 42 of a dispersal valve cover 40 in a first direction without rotating a cap 41 of the dispersal valve cover 40 to unlock the dispersal valve cover 40 from the dispersal valve housing 11; (2) further rotating the cover housing 42 in the first direction to remove the dispersal valve cover 40 from an open end of dispersal valve housing 11; (3) placing a dispersant 15 within a chamber 14 of the dispersal valve housing 11; (4) placing the dispersal valve cover 40 on the open end of the dispersal valve housing 11; and (5) rotating the cover housing 42 in a second direction to move a portion of the cap 41 into a locking fluid tight engagement with the open end of the dispersal valve housing 11 to provide for fluid tight enclosure of the chamber 14 of the dispersal valve housing 11.

The above method can also include the steps of (6) placing the dispersal valve cover 40 on the open end of the dispersal valve housing 11 with a female threads 46 of the cover housing 42 engaging a male threads of the dispersal valve housing 11; (7) filling the chamber 14 of the inline dispersal valve housing 11 the dispersant 15; (8) replacing a depleted dispersant supporting canister 83 with a fully charged dispersant supporting canister 83; and (9) rotating the cover housing 42 in the second direction to move the portion of the cap 41 against a sealing ring 49 to compress the sealing ring 49 to provide for a fluid tight seal.

We claim:

1. A method of replenishing an inline dispersal valve comprising the steps of:

grasping a set of integrally formed, ergonomically shaped, radially protruding handles of a cover housing;

rotating the cover housing of a dispersal valve cover in a first direction without rotating a cap of the dispersal valve cover to unlock the dispersal valve cover from the a dispersal valve housing;

further rotating the cover housing in the first direction to remove the dispersal valve cover from an open end of the dispersal valve housing;

removing the cap from the dispersal valve housing to access a chamber of the dispersal valve housing;

placing a dispersant within the chamber of the dispersal valve housing;

placing the dispersal valve cover on the open end of the dispersal valve housing; and rotating the cover housing in a second direction to move a portion of the cap into a locking fluid tight engagement with the open end of the dispersal valve housing to provide for fluid tight enclosure of the chamber of the dispersal valve housing.

2. The method of claim 1 wherein the step of placing the dispersal valve cover on the open end of the dispersal valve housing comprises placing the dispersal valve cover on the open end of the dispersal valve housing with a female threads of the cover housing engaging a male threads of the dispersal valve housing and the step of grasping a set of integrally formed, ergonomically shaped, radially protruding handles of a cover housing comprises grasping a set of four handles that are located opposite each other to provide a balanced rotational force of the cover housing.

3. The method of claim 1 wherein the step of placing a dispersant within a chamber of the dispersal valve housing comprises the step of filling the chamber of the inline dispersal valve housing the dispersant and the step of grasping a set of integrally formed, ergonomically shaped, radially protruding handles of a cover housing comprises grasping two handles.

4. The method of claim 1 wherein the step of placing a dispersant within a chamber of the dispersal valve housing comprises the step of replacing a depleted dispersant supporting canister with a fully charged dispersant supporting canister.

5. The method of claim 1 including the step of rotating the cover housing in the second direction to move the portion of the cap against a sealing ring to compress the sealing ring to provide for a fluid tight seal.

* * * * *

UNITED STATES PATENT AND TRADEMARK OFFICE
CERTIFICATE OF CORRECTION

PATENT NO. : 8,464,743 B2  
APPLICATION NO. : 12/584554  
DATED : June 18, 2013  
INVENTOR(S) : Joseph A. King et al.

Page 1 of 1

It is certified that error appears in the above-identified patent and that said Letters Patent is hereby corrected as shown below:

In the Claims:

Column 14

Claim 2, line 6: "a set of integrally" should read --the set of integrally--

Claim 2, line 8: "a cover housing" should read --the cover housing--

Claim 3, lines 1-2: "placing a dispersant within a chamber" should read --placing the dispersant within the chamber--

Claim 3, lines 4-5: "grasping a set of integrally formed" should read --grasping the set of integrally formed--

Claim 3, line 6: "handles of a cover housing" should read --handles of the cover housing--

Claim 4, lines 1-2: "placing a dispersant within a chamber" should read --placing the dispersant within the chamber--

Signed and Sealed this  
Sixth Day of August, 2013

Teresa Stanek Rea  
*Acting Director of the United States Patent and Trademark Office*

UNITED STATES PATENT AND TRADEMARK OFFICE
CERTIFICATE OF CORRECTION

PATENT NO. : 8,464,743 B2
APPLICATION NO. : 12/584554
DATED : June 18, 2013
INVENTOR(S) : Joseph A. King et al.

Page 1 of 1

It is certified that error appears in the above-identified patent and that said Letters Patent is hereby corrected as shown below:

In the Claims:

Column 14, line 20 (Claim 2, line 6) "a set of integrally" should read --the set of integrally--

Column 14, line 22 (Claim 2, line 8) "a cover housing" should read --the cover housing--

Column 14, lines 25-26 (Claim 3, lines 1-21) "placing a dispersant within a chamber" should read --placing the dispersant within the chamber--

Column 14, line 28-29 (Claim 3, lines 4-5) "grasping a set of integrally formed" should read --grasping the set of integrally formed--

Column 14, line 30 (Claim 3, line 6) "handles of a cover housing" should read --handles of the cover housing--

Column 14, lines 32-33 (Claim 4, lines 1-2) "placing a dispersant within a chamber" should read --placing the dispersant within the chamber--

This certificate supersedes the Certificate of Correction issued August 6, 2013.

Signed and Sealed this
Twenty-seventh Day of August, 2013

Teresa Stanek Rea
*Acting Director of the United States Patent and Trademark Office*